United States Patent [19]

Wolfe et al.

[11] Patent Number: 5,041,701
[45] Date of Patent: Aug. 20, 1991

[54] EDGE LINEARIZATION DEVICE FOR A CONTACT INPUT SYSTEM

[75] Inventors: Andrew L. Wolfe, Pittsburgh, Pa.; Gary L. Barrett, Austin, Tex.

[73] Assignee: Carroll Touch Incorporated, Round Rock, Tex.

[21] Appl. No.: 168,292

[22] Filed: Mar. 15, 1988

[51] Int. Cl.⁵ .............................................. G08C 21/00
[52] U.S. Cl. .................................................... 178/18
[58] Field of Search ............................... 178/18, 19, 20

[56] References Cited

U.S. PATENT DOCUMENTS

| | | | |
|---|---|---|---|
| 3,632,874 | 1/1972 | Malavard | 178/18 |
| 3,798,370 | 3/1974 | Hurst | 178/18 |
| 4,198,539 | 4/1980 | Pepper, Jr. | 178/18 |
| 4,220,815 | 9/1980 | Gibson et al. | 178/18 |
| 4,293,734 | 10/1981 | Pepper, Jr. | 178/18 |
| 4,371,746 | 2/1983 | Pepper | 178/18 |
| 4,649,232 | 3/1987 | Nakamura et al. | 178/18 |
| 4,661,655 | 4/1987 | Gibson et al. | 178/18 |
| 4,725,695 | 2/1988 | Murdock et al. | 178/18 |
| 4,797,514 | 1/1989 | Talmage et al. | 178/18 |

FOREIGN PATENT DOCUMENTS

| | | |
|---|---|---|
| 0089295 | 9/1983 | European Pat. Off. |
| 089295 | 9/1983 | European Pat. Off. |
| 0186464 | 7/1986 | European Pat. Off. |

OTHER PUBLICATIONS

European Search Report, dated 1-27-89.

Primary Examiner—Stafford D. Schreyer
Attorney, Agent, or Firm—Anton P. Ness; Robert W. Pitts

[57] ABSTRACT

An edge linearization device for linearizing the electric fields in a resistive surface is described. A plurality of electrodes are disposed on the perimeter of an area on a surface having a substantially uniform resistivity. The device utilizes the geometry of the spaces between adjacent conductive elements to provide resistive elements. At least one of the electrodes has an extension. The extension or extensions of the electrodes are progressively inwardly displaced into the area from the perimeter so that there is at least one center-most extension on a first portion of said perimeter and also on a second, opposing portion of said perimeter. In a preferred embodiment, the invention utilizes a surface with a substantially rectangular area having four sides and four corners. Disposed along the sides are a plurality of electrodes and corner electrodes and disposed in the corners of the surface are corner connectors. The use of T-shaped extensions of the electrodes on such a surface is also disclosed. When an electric potential is selectively applied across the surface, a unique electric potential exists which corresponds to the location of a movable object on the surface. A contact input system utilizing such an edge linearization device is disclosed. The contact input system utilizes the surface with the electrodes, corner electrodes, and corner connectors disposed thereon with a movable object for selectively contacting the surface, means responsive to the object for determining the object's location on the surface, and means for selectively applying an electric potential across the surface.

17 Claims, 9 Drawing Sheets

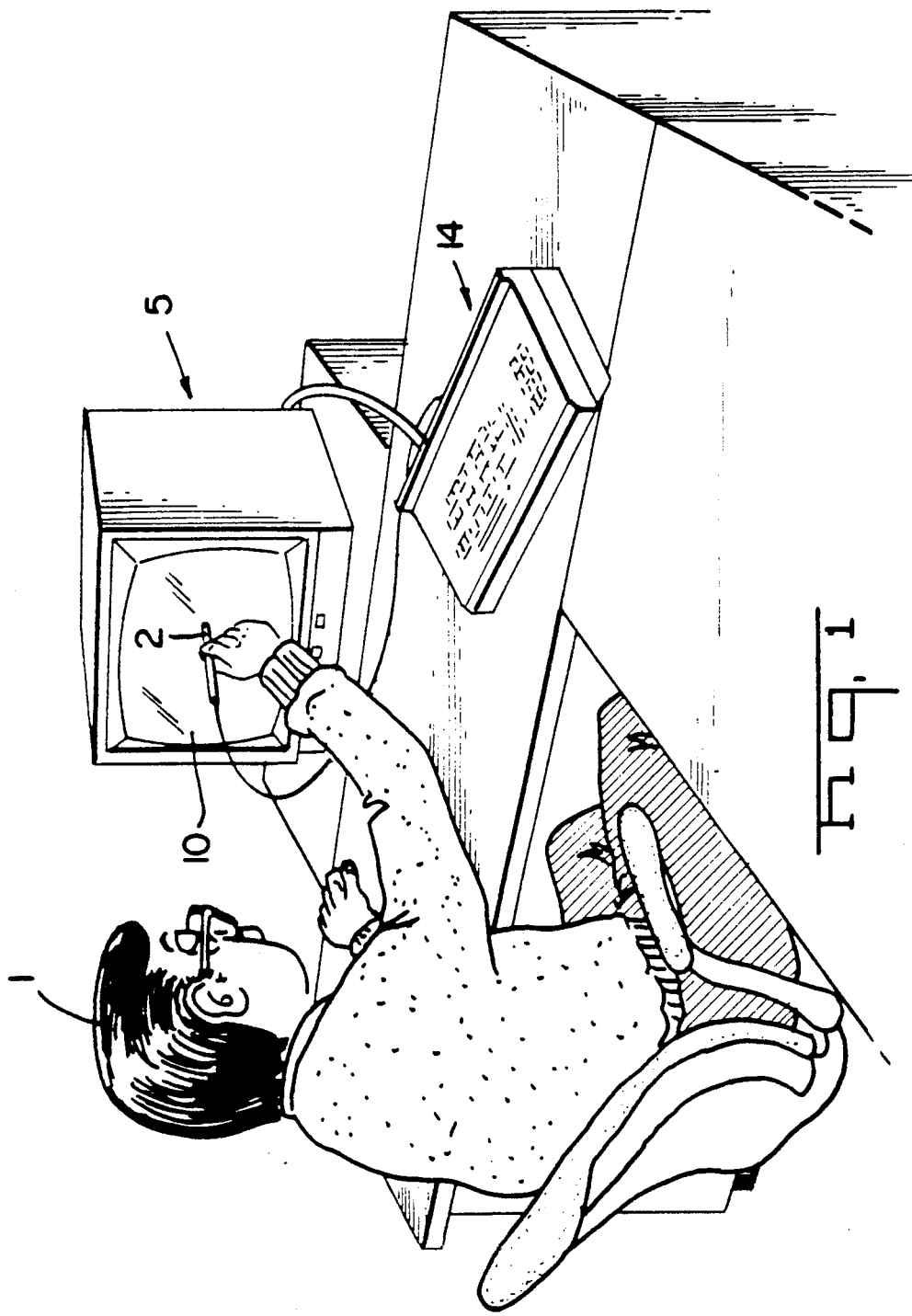

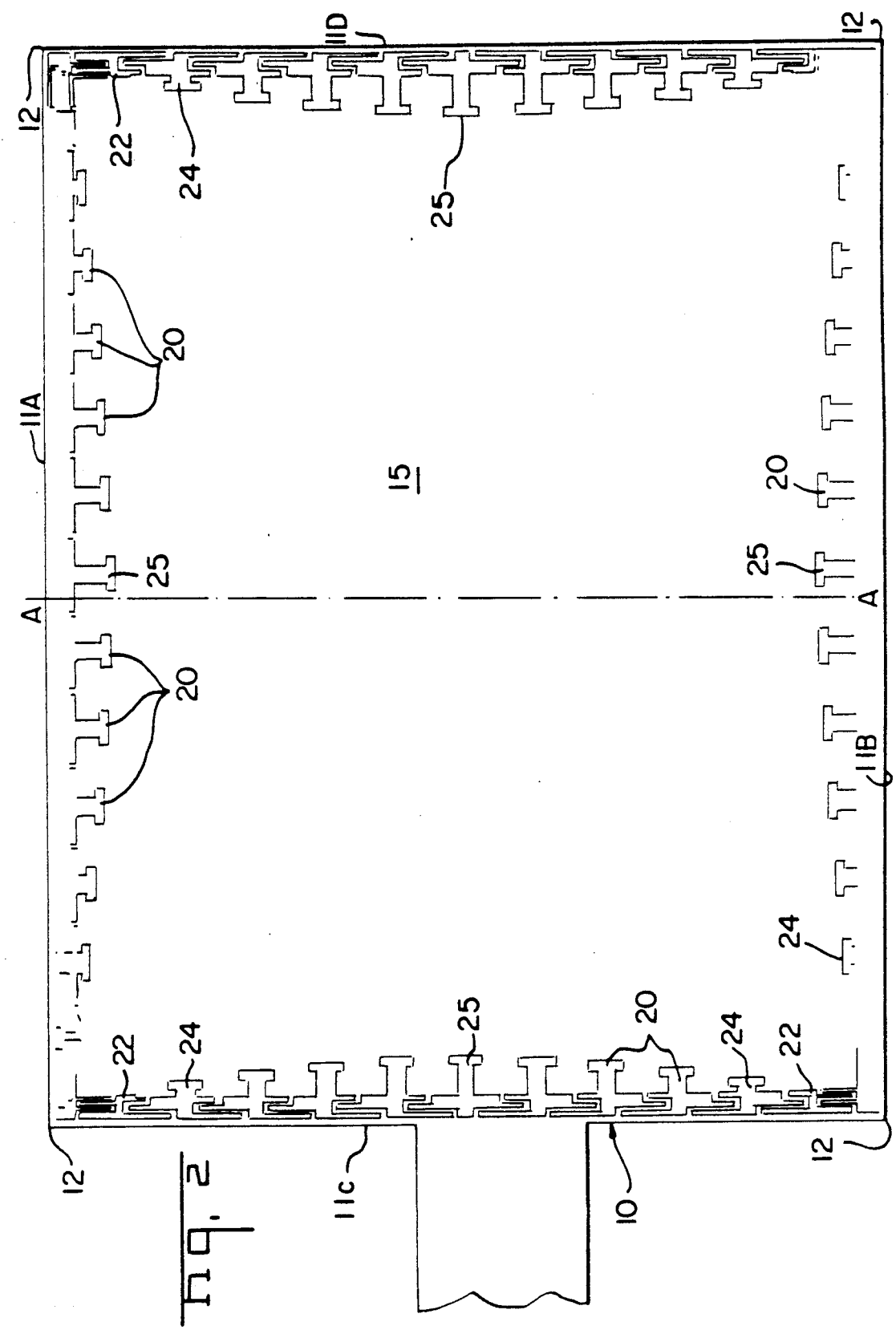

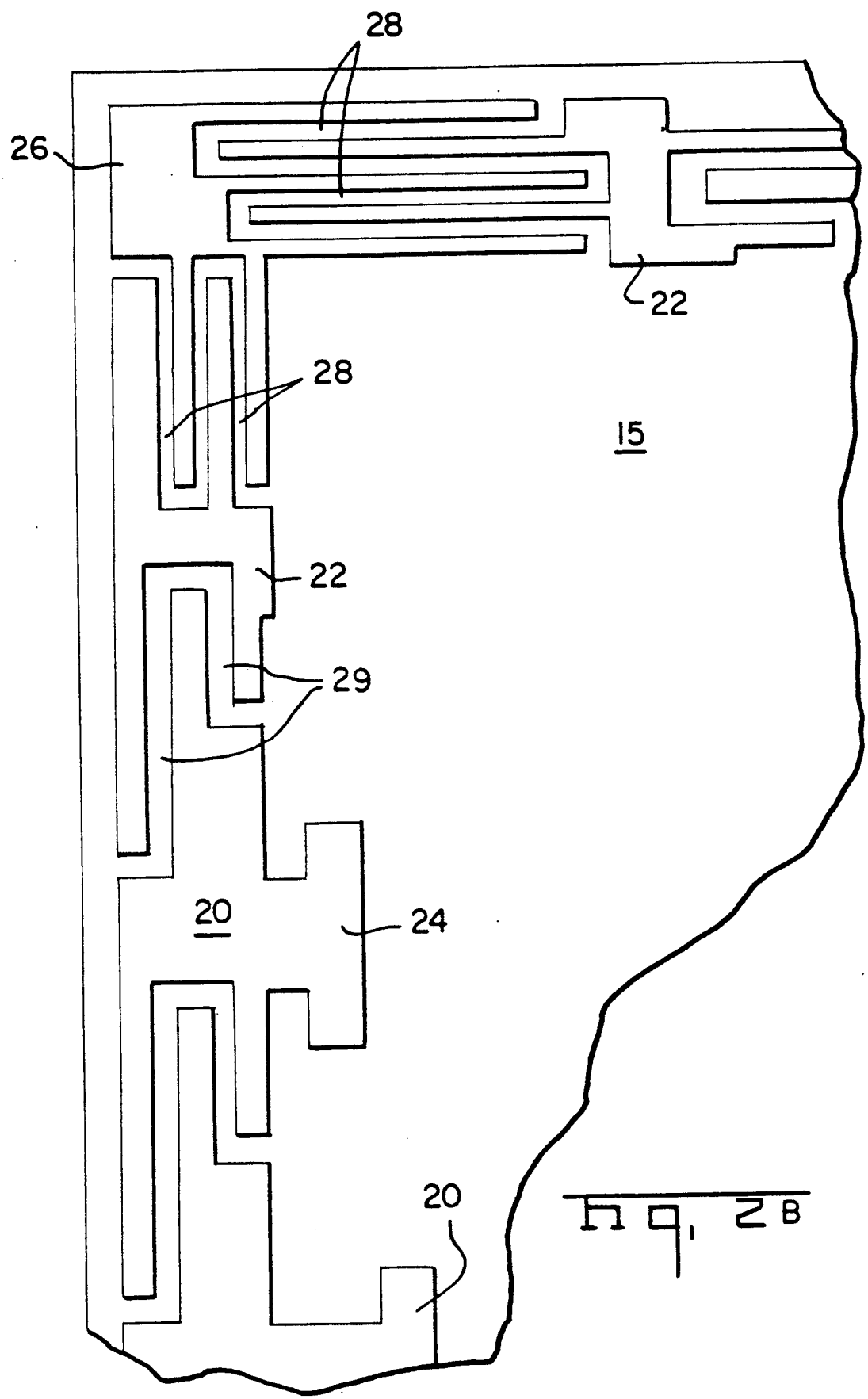

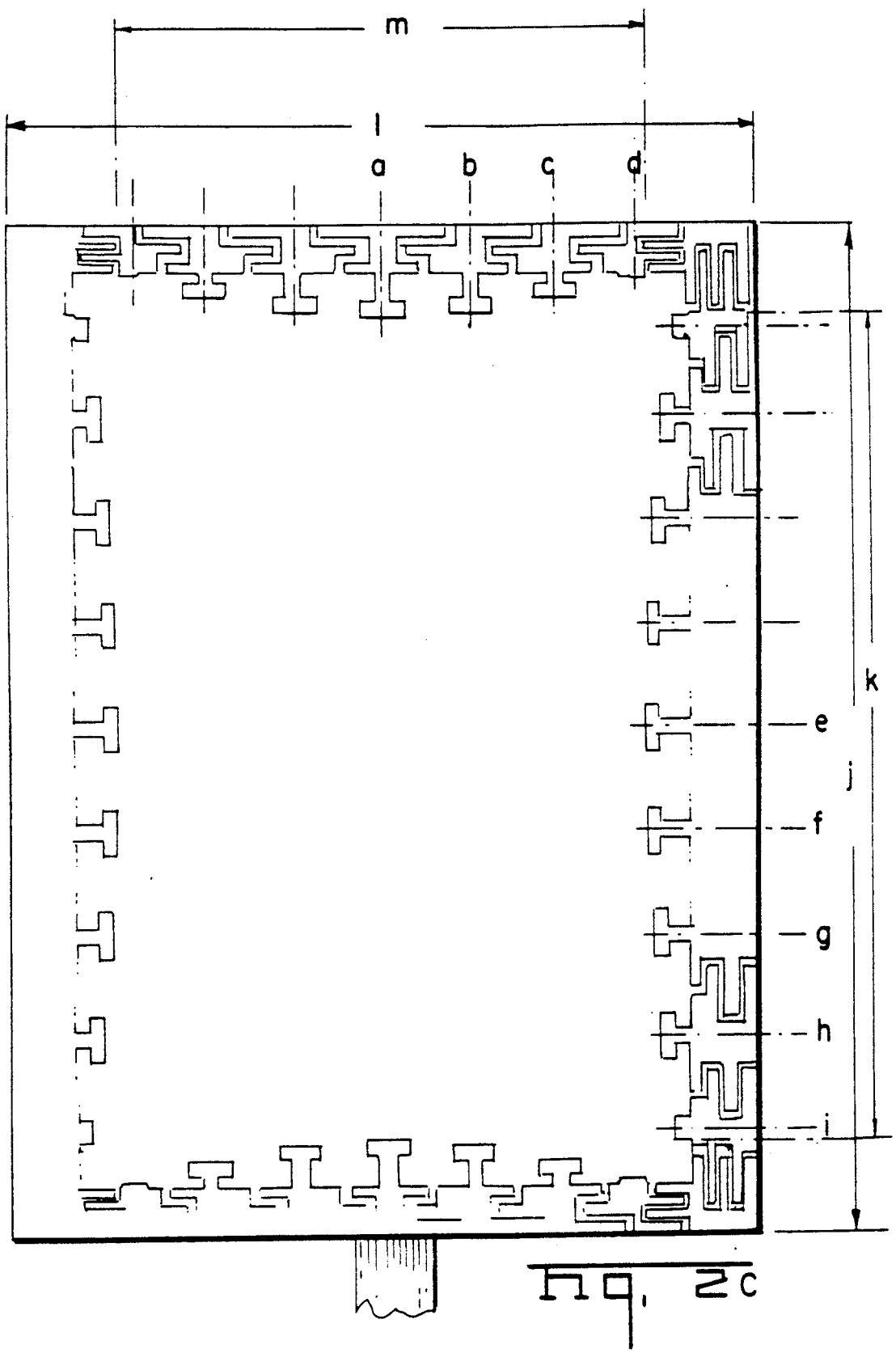

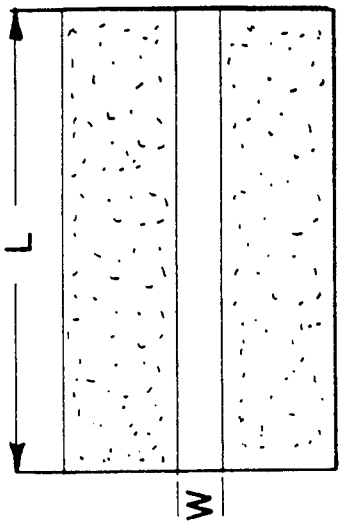
Fig. 7D
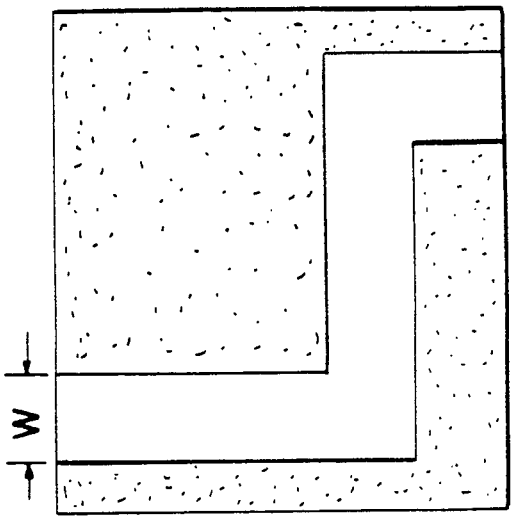
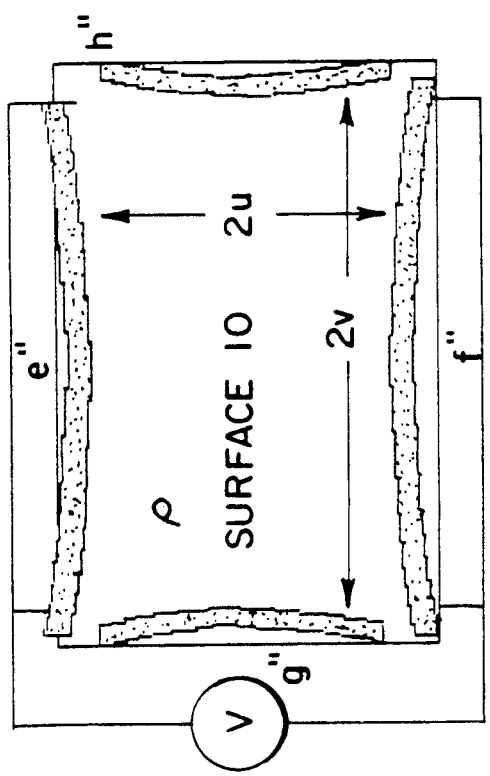
Fig. 7C
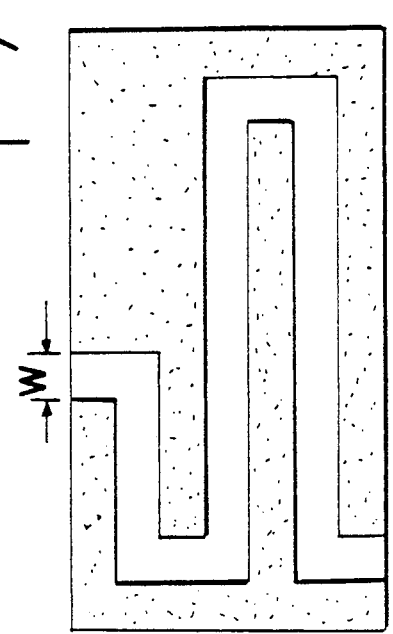
Fig. 7E

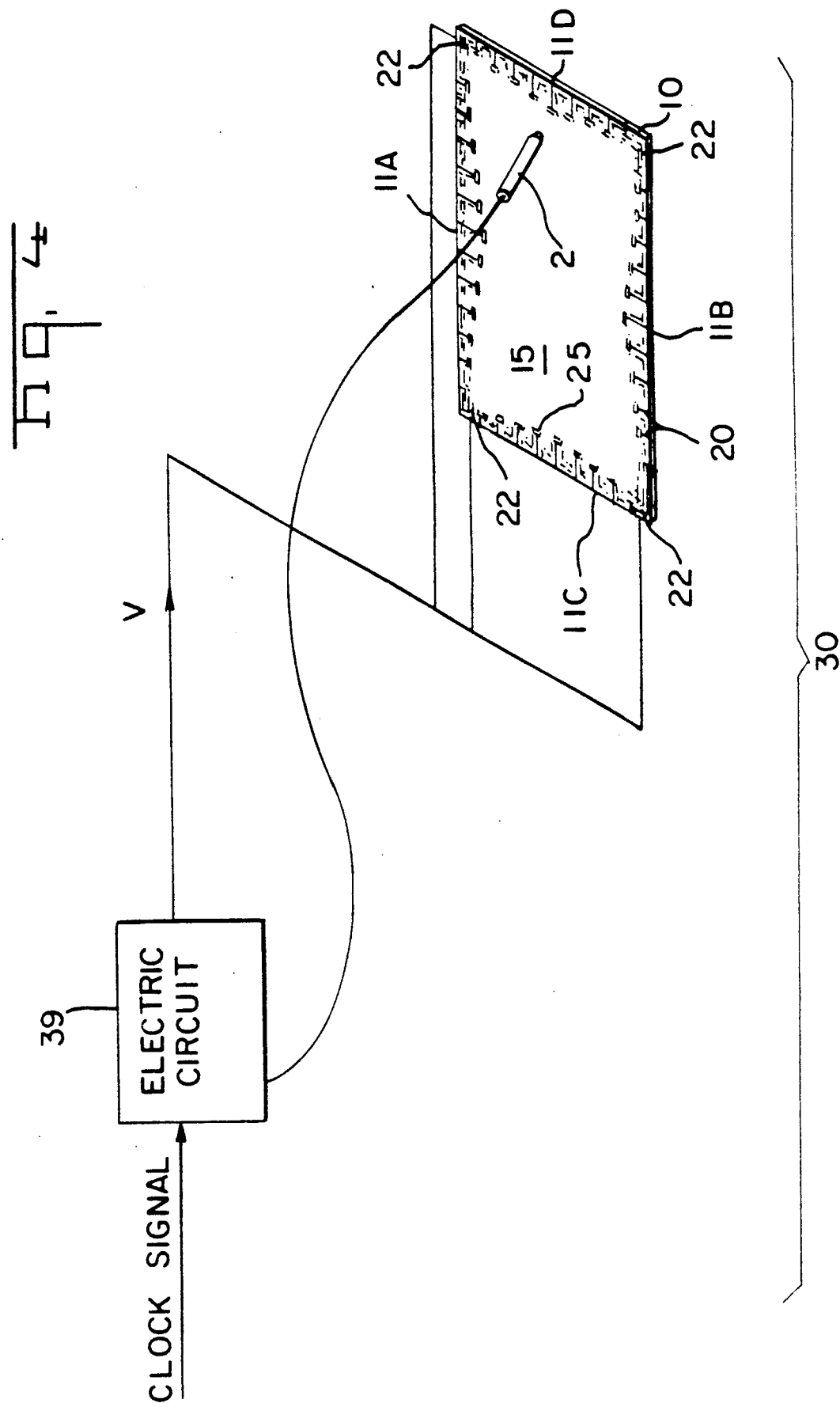

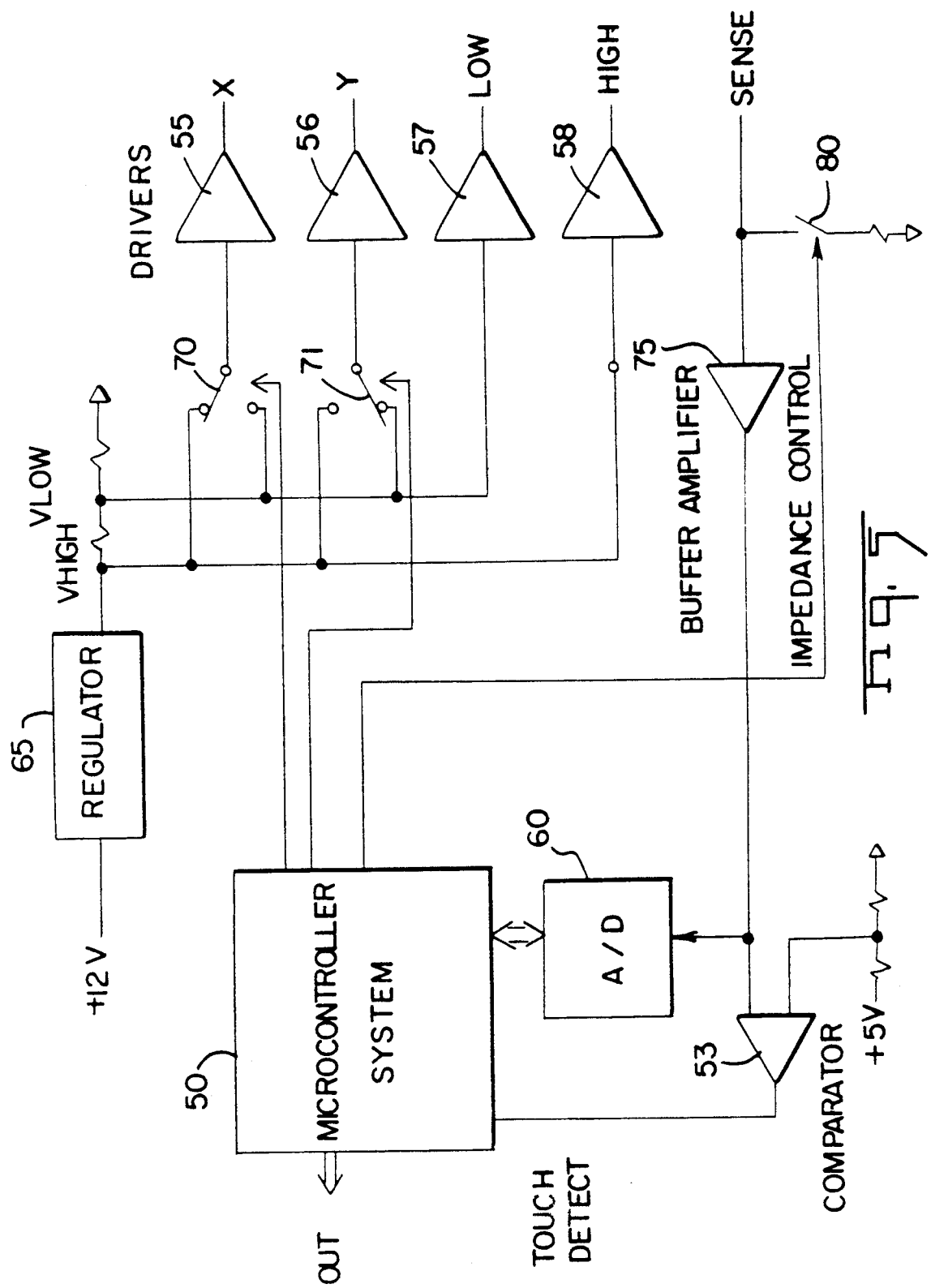

EDGE LINEARIZATION DEVICE FOR A CONTACT INPUT SYSTEM

FIELD OF THE INVENTION

This invention relates to an edge linearization device for producing orthogonal electric fields in a surface and, more particularly, to an edge linearization device for producing orthogonal electric fields in a resistive surface for use in a contact input system which is able to locate an object in contact with the resistive surface.

BACKGROUND OF THE INVENTION

Touch input systems or contact input systems which determine the location of an object touching a surface are utilized in a wide variety of applications, including computer graphics, computer aided design, and computer aided manufacturing systems. Such an object may be either movable or stationary. These applications often require that the location of the object be performed with a high degree of accuracy. "Contact input systems" include, in addition to touch input systems, systems including digitizers in which a device is responsive to a contact or touch at a specific location or a continuous contact across a surface. Of course, contact input systems are also responsive to a series of such touches or contacts. A contact input system could also comprise an overlay device having a transparent cover layer over a conductive surface, with an operator able to actuate the system by touching the cover layer with a finger. Such systems also can be used with opaque or translucent layers. It will be understood that "contact input system," as used herein, includes such overlay devices, as well as digitizers.

Contact input systems in the past have utilized a variety of approaches for locating an object touching a surface in a contact input system. Typically, the surface in such a system is of a substantially uniform resistivity. Electrodes are connected to the surface. The electrodes are usually made of a material which is more conductive than the surface and are often silk-screen onto the surface. Generally, such contact input systems include means for applying an electric potential across the surface in a first direction and then applying an electric potential across the surface in a second direction orthogonal to the first direction. Consequently, when the surface is touched by an object, such as an operator's finger, or a stylus or other means, a unique electric potential between the electrodes and the object touching the surface exists which corresponds to the location of the object on the surface and the distance between the electrodes and the object. In addition to providing an x-y location, such systems can be combined with means to determine and provide a z-axis value, which may be based upon pressure, location, or some other parameter.

A common problem with such systems in the past has been the distortion of the electric field created in the surface by the application of an electric potential. When such fields are distorted (i.e., nonlinear), the accurate determination of the location of an object touching the surface becomes exceedingly difficult, if not impossible. Generally, fairly precise linearity is needed to allow the accurate determination of the location of the object on the surface. Most of these systems depend upon matching the values of discrete resistive elements to the resistive value of a resistive surface's thin film. Because precise values of such resistivities are generally not commercially available, matching such values presents difficulties in manufacture and is also a source of error. Consequently, attempts have been made to improve the linearity of the electric fields generated in the surface.

Prior attempts to linearize the electric fields in such surfaces in contact input systems have included the use of resistive elements between electrodes disposed on the surface. Often, such resistive elements were a collection of discrete resistors connected to the surface or connected to the electrodes but not located within the active surface area. Examples of such attempts can be found in Pepper, U.S. Pat. No. 4,198,539, issued Apr. 15, 1980, and in Hurst, U.S. Pat. No. 3,798,370, issued Mar. 19, 1974. The use of such resistive elements is undesirable, however, because of the need for additional parts and increased difficulty and expense in manufacture, as well as a lack of durability and reliability.

A similar attempt to linearize the electric fields created in a resistive surface is disclosed in Gibson, et al., U.S. Pat. No. 4,661,655, issued Apr. 28, 1987. This attempt involves the use of contact electrodes of varying size and shape connected to discrete resistive elements made of Nichrome wire. The Nichrome wire is disposed on a resistive surface at its corners and along the edges of the surface. The use of such resistive elements in addition to the surface, however, creates additional difficulty and expense in manufacture and also decreases durability and reliability.

Other attempts at linearizing the electric fields produced in the surface have been based on a series of conductive elements for operation as electrodes screened onto the resistive surface in a desired pattern to produce an equipotential area along the sides of the surface where the electrodes are located. An example of such an approach is disclosed in Pepper, U.S. Pat. No. 4,293,734, issued Oct. 6, 1981. Such an approach, however presents manufactured problems and also lacks reliability. Other attempts have included the use of diodes disposed along the sides of the surface for controlling the direction of the current flow across the surface. An additional disadvantage of such an approach is the expense of the diode parts, as well as the tendency of the diodes to wear out or become inoperative, thereby rendering the contact input system useless or inaccurate.

Still other attempts have focused on the use of corner electrodes and a perimeter area of a much lower resistivity than the principal useful interior area of the resistive surface to linearize the electric fields generated in the surface. An example of this approach is Nakamura, et al., U.S. Pat. No. 4,649,232, issued Mar. 10, 1987. Such an approach, however, fails to adequately linearize the surface to provide a suitably accurate surface for use in a contact input system without undue expense and difficulty in manufacture.

Accordingly, it is an object of the invention to provide an inexpensive and easily manufactured device for linearizing the electric fields in a surface for use in a contact input system.

It is a further object of the invention to provide a more reliable and durable device for linearizing the electric fields in a surface for us in a contact input system. It is a still further object of the invention to provide a surface for use in a more accurate and reliable contact input system.

It is a still further object of the invention to provide a reliable and accurate contact input system with a surface which is inexpensive and is easily manufactured.

It is still further object of the invention to provide a reliable and accurate contact input system which does not require the use of discrete resistive elements in addition to the resistivity of the surface.

It is yet another object of the invention to provide an edge linearization device and contact input system which maximizes the size of the active surface area and which may be increased or decreased in total size with a minimal effect on the size of the active area on the surface.

SUMMARY OF THE INVENTION

This invention utilizes the placement of the electrodes along the perimeter of an area on a resistive surface with at least one of the electrodes having an extension which is inwardly disposed so that there exists on opposing portions of the perimeter of the surface at least one extension which is inwardly disposed to produce an electric potential field with a prescribed geometry, such as by linearizing the electric fields present in the surface when an electric potential is selectively applied across the electrodes on the surface. One embodiment of this invention also utilizes electrodes, with at least one of the electrodes having T-shaped extension located generally along the perimeter of an area on a resistive surface to linearize the electric fields present in the surface when an electric potential is selectively applied across the electrodes on the surface. One feature of the invention is the use of gaps or spaces, selectively determined, between conductive elements connected to the surface to provide resistors. The invention utilizes the T-shaped extension of the electrodes and the progressively inward displacement of extensions of the electrodes in the surface area both alone and in conjunction with each other, and also in a contact input system, for linearizing the electric fields existing in the surface when an electric potential is applied across the surface. In a preferred embodiment of the invention, a substantially rectangular area with four sides and four corners is used. In another preferred embodiment of the invention, the progressively inward displacement of the extensions of the electrodes on each side of the area follows the shape of a parabola with its vertex located approximately near the midpoint of each side.

BRIEF DESCRIPTION OF THE FIGURES

FIG. 1 is an illustration of the use of a contact input system having a surface which is selectively touched by an object held by an operator.

FIG. 2 is a top view of the edge linearization device which shows the electrodes disposed on the resistive surface.

FIG. 2B is a top view showing in detail a corner connector 26, corner electrodes 22, and electrode 20, as well as spaces 28, 29.

FIG. 2C is a top view showing in detail the edge linearization device with reference to the pattern and dimensions of electrodes 20, corner electrodes 22, corner connectors 26, and spaces 28, 29.

FIGS. 3A, 3B, and 3C are top views of edge linearization devices with continuous linearly resistive edge elements.

FIGS. 3D and 3E are detailed views of the gap or space geometry between adjacent conductive elements.

FIG. 4 is an illustration of a contact input system which includes a schematic of a circuit for determining the location on a surface where a movable object is touching the surface in a contact input system.

FIG. 5 is a schematic diagram of the electric circuit 39 of FIG. 4.

DESCRIPTION OF THE INVENTION

Figure 2A:
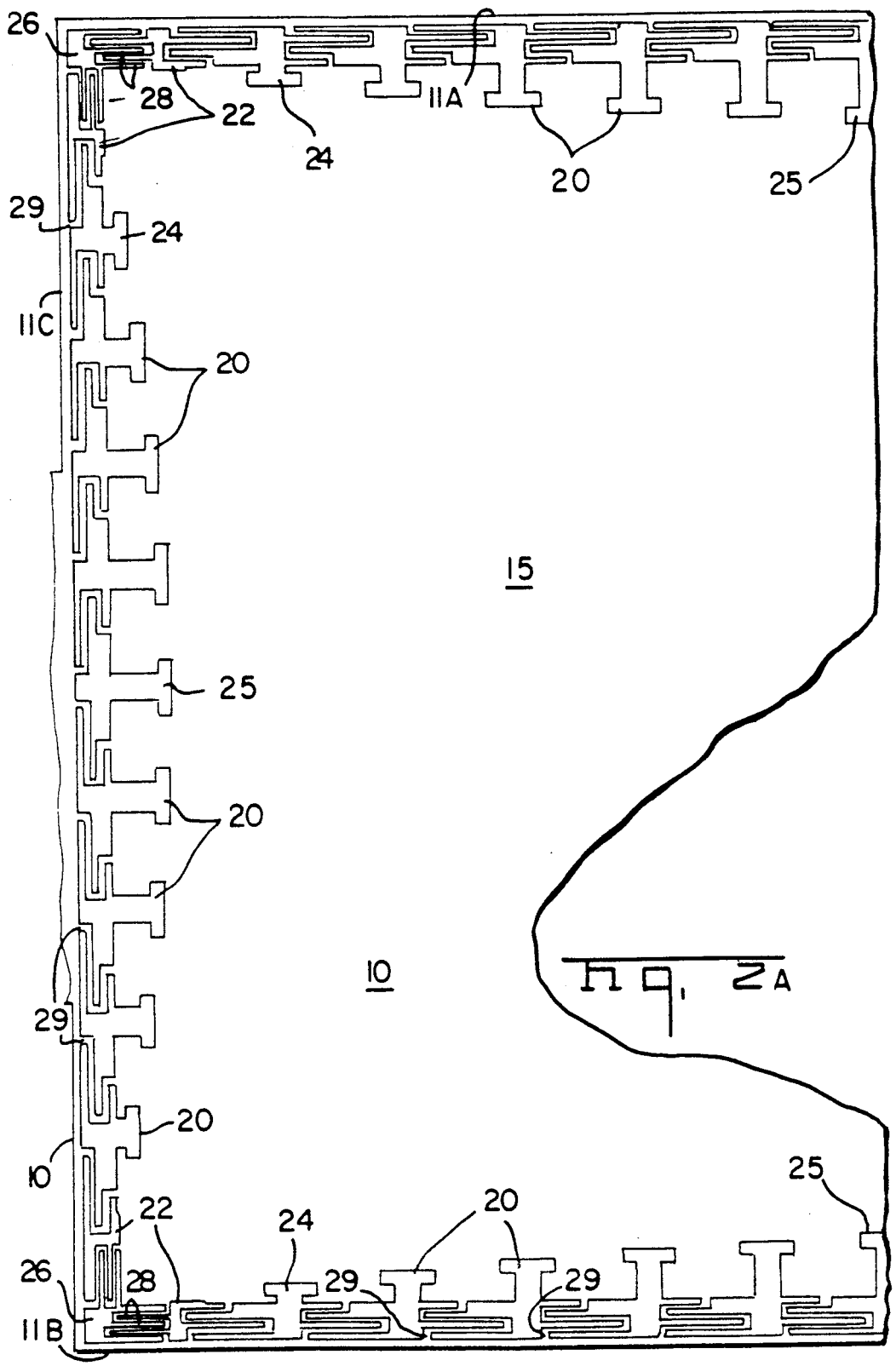
FIG. 2A is a top view of one-half of the edge linearization device, enlarged to show additional details of electrodes 20, corner electrodes 22, corner connectors 26, and spaces 28, 29.
Figure 7A:
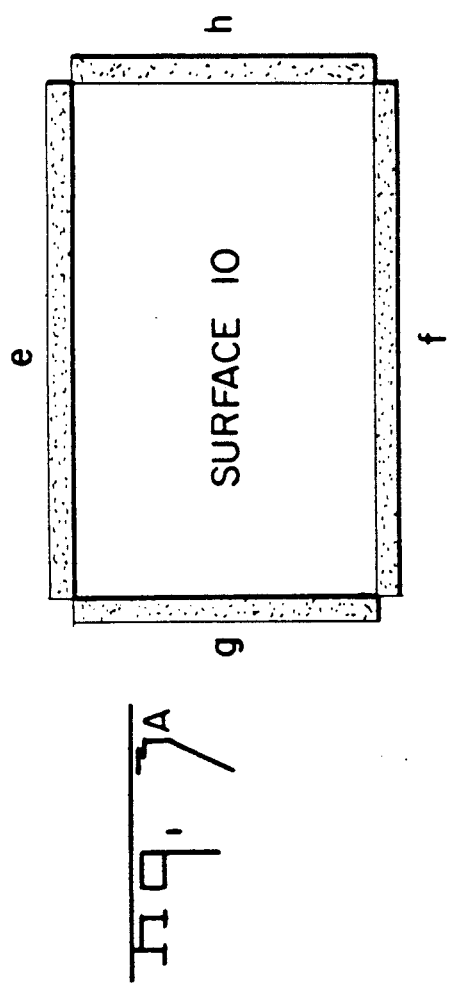
Figure 7B:
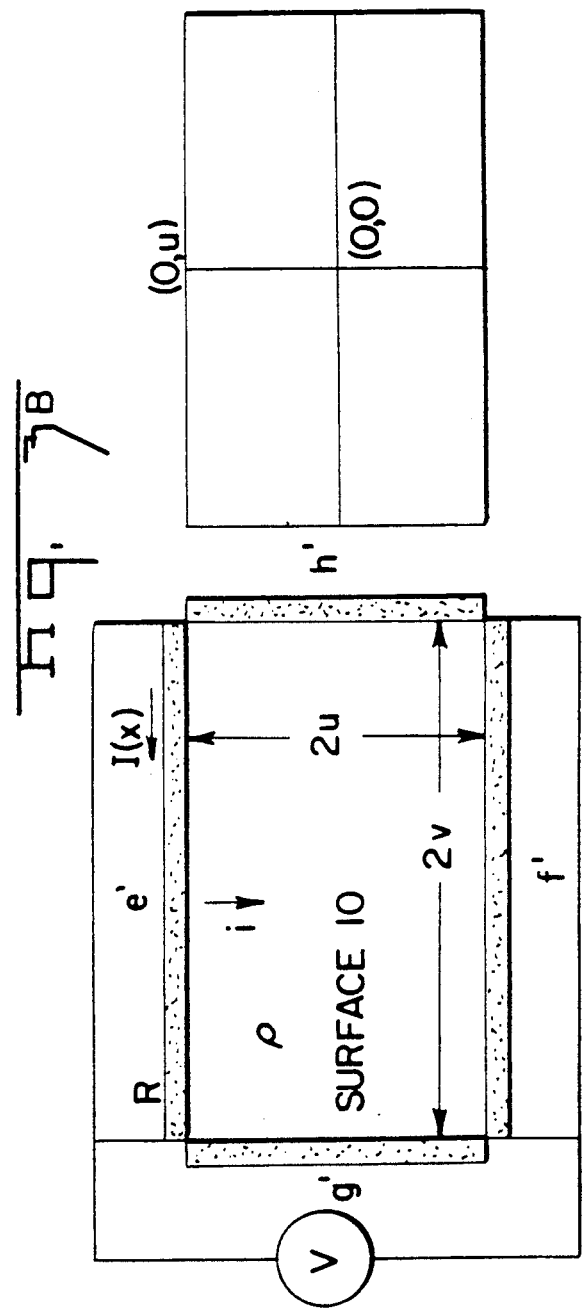

The present invention relates to an edge linearization device adapted for use in a contact input system. Contact input systems usually are useful for interactive operation with computer systems. In such computer systems, an operator often uses an object, such as a finger, pencil, stylus, or other means, to contact a surface. Such systems often include means for determining the location of contact between an object and the surface.

In FIG. 1, an operator 1 is shown. Operator 1 is able to selectively touch a surface 10 in a contact input system with an object 2, such as a pencil, finger, stylus or other similar means. Surface 10 of the contact input system is removably attached to a CRT of a computer system 5.

In FIG. 2, a surface 10 having a substantially uniform resistance is shown. Surface 10 defines in FIG. 2 a substantially rectangular area 15 having four sides 11 and four corners 12. The substantially rectangular area is adapted for use with a CRT screen of a computer which is generally rectangular in shape and is slightly rounded at its corners. Surfaces 10 can, of course, define an area with perimeter configurations other than a rectangular and also may be planar or contoured. Such a surface 10 is known to those skilled in the art and is commercially available in a variety of resistive values from various companies. For example, a suitable surface 10 can be obtained from the Donnelly Company of Holland, Mich. Surface 10 essentially comprises a substrate which typically consists of plastic, glass, or some other suitable material and a resistive coating of a material which is typically a semiconducting metal oxide, such as indium-tin oxide, although other materials, such as tin oxide, tin antimony oxide, or indium oxide, could be used. Any such coating is to be understood as a "thin film." In addition, similar "thick" films, as well as opaque films, could be used. For best results, we prefer a surface 10 having a substantially uniform resistivity of 200–500 ohms per square. However, a wide variety of resistive values can easily by used to achieve acceptable results.

Disposed in contact with surface 10 is a plurality of conductive elements or electrodes 20. Electrodes 20 are electrically connected to surface 10 and can be placed in contact with surface 10 through a variety of means. Although electrodes 20 need not lie on a top face of surface 10 and need not be electrically connected to surface 10 except for the end portions of electrodes 20 which extend into area 15, for best results, we prefer to dispose electrodes 20 on a top face of surface 10. Later references to electrodes 20 disposed "on" surface 10 will be understood to include any manner in which electrodes 20 are placed in contact with surface 10. Electrodes 20 are selectively spaced apart from each other. For best results, we prefer silk-screening electrodes 20 onto surface 10 with standard lithographic techniques, although a variety of methods are available which are known to those skilled in the art. Silk-screening electrodes 20 onto surface 10 minimizes the number of steps required to manufacture the invention by producing electrodes 20 in the desired pattern, as described in more detail below. Silk-screening also allows close control of the process to yield configurations of electrodes 20 within tight tolerances. As will be obvious to those skilled in the art, other configurations of electrodes 20 easily can be silk-screened onto surface 10.

As can be seen from FIG. 2, a plurality of electrodes 20 having T-shaped extensions are located on each side 11 of area 15 of surface 10 in a manner so that the innermost extent of each electrode 20 is greater than the adjacent electrode 20 closer to the corners 12 of area 15. On each side of area 15, there is at least one center-most electrode 25 which extends further into area 15 than the other electrodes 20 on a given side 11 of area 15. As is shown in FIG. 2, the T-shaped extensions of electrodes 20 extend into area 15 in a progressively more inwardly disposed manner, with at least one center-most extension 25 most inwardly disposed into area 15. When area 15 is not substantially rectangular as is shown in FIG. 2, extensions of electrodes 20 disposed along the perimeter of area 15 are disposed in a progressively inward manner so that there is at least one center-most extension 25 which is most inwardly disposed into area 15 from a first portion of the perimeter of area 15 and at least one center-most extension 25 which is most inwardly disposed into area 15 from a second portion of the perimeter which opposes the first portion of the perimeter. To obtain best results in terms of greater linearity of the substantially orthogonal electric fields created in surface 10, we prefer that the extensions of electrodes 20 be T-shaped as shown in FIG. 2 and made of a silver ink which is commercially available and well known to those skilled in the art and which is easily silk-screened onto surface 10. Also for best results, we prefer that the progressively inward displacement of the extensions of electrodes 20 into area 15 approximate or follow the shape of a parabola, with a center-most extension 25 located approximately at the location of the vertex of the parabola outlined by the displacement of electrodes 20.

Also disposed on the top of surface 10 are corner electrodes 22, as is shown in FIG. 2. Corner electrodes 22 are positioned near the corners 12 of area 15 and are made of the same material as electrodes 20. We prefer that corner electrodes 22 also be silk-screened onto surface 10. Also, as shown in FIG. 2, the electrode 24 adjacent each corner electrode 22 is selectively spaced apart from corner electrode 22. The spacing between corner electrodes 22 and the electrodes 24 adjacent corner electrodes 22 and the spacing between the other electrodes 20 on each side 11 is selectively chosen, along with the form and dimensions of electrodes 20 and corner electrodes 22, as will be more fully described below. Adjacent and between corner electrodes 22 is a corner connector 26, which can be connected electrically to various electric circuitry. As noted above with respect to electrodes 20, corner electrodes 22 and corner connectors 26 need not lie on a top face of surface 10, nor must corner electrodes 22 and corner connectors 26 be electrically connected to surface 10, other than the connection of corner electrodes 22 at the end portion of corner electrodes 22 which extends into area 15.

As shown in FIG. 2A and in FIG. 2B, gaps or spaces 28 between a corner electrode 22 and a corner connector 26 are selectively chosen to create a resistance $R_1$ between corner connector 26 and corner electrodes 22. Spaces 29 between electrodes 20 are selectively chosen to create a resistance $R_2$ between electrodes 20. The values of $R_1$ and $R_2$ are a function of the geometry of gaps or spaces 28, 29 between the adjacent conductive elements.

We investigated developing an apparatus in which its edges would serve as effective sources for current flowing perpendicular to the edges and, concurrently or alternately, remain non-invasive with respect to currents flowing parallel to the edges. One approach would be through the use of linearly resistive elements along each edge, as is shown in FIG. 3A. Devices e, f, g, and h in FIG. 3A are such elements with a resistance per unit length which remains constant. The width of devices, e, f, g, and h can be considered insignificant in relation to the apparatus. If an equipotential line is established along element e, and another along element f, a constant current would flow perpendicular to these elements through resistive elements g, and h, as well as through surface 10, thereby establishing an identical voltage gradient in surface 10 and in the edge elements.

Unfortunately, it is not easy to create an equipotential across a resistive element like it is with a conductive element. However, if the resistance of the edge elements is kept low with respect to surface 10, a good approximation of an equipotential edge can be created. Furthermore, the error caused by the resistance of these elements can be analyzed.

Given an apparatus as shown in FIG. 3B, of dimensions 2v by 2u, using the coordinate system shown, i.e., with the origin at the center, we can define the following: the resistive elements e' and f', have a resistance of R, end to end. The resistive surface 10 has a sheet resistivity $\rho$. The electric potential V is applied at the top corners with respect to the lower corners. If the resistive elements e' and f' were equipotential edges, then a current would flow through surface 10 with a constant current density i. This current is supplied through resistive element e'. In fact, this current can be described as a function of the x coordinate. In the first quadrant, this current I(x) is defined as the current flowing towards the center at the point (x,u) by the equation:

$$I(x) = \int_0^x i\,dx = ix.$$

The actual potential at every point along element e' can be further computed. If $V_a$ is defined as the potential between point (O,O) and (O,u), and A is defined as the aspect ratio $A = u/v$, then the voltage drop from point (O,u) to point (x,u) can be determined from the equation:

$$E(x) = (RV_a/4\rho A)(x^2).$$

By selecting appropriate values of R and $\rho$, this voltage drop can be made extremely small; however, this would require using a very low value R. This would cause the apparatus to consume huge amounts of power and create additional problems. Therefore, this voltage drop can be compensated for and avoided using such amounts of power. In fact, it can be shown that E(x) is equivalent to the voltage drop in surface 10 caused by the current i flowing through a distance $d(x)=(R/4\rho A)(x^2)$. Therefore, if surfaces 10 is extended by pulling back element e' by a distance d(x), then the voltage drop between the point (x,u+d(x)) and (O,u) is matched by an equivalent drop between (x,u+d(x)) and (x,u), thereby creating an equipotential line along y=u, as intended, and establishing that i is constant. The result is that resistive element e' becomes parabolic in shape; however it must still be a linear resistor with respect to the x coordinate. Element f' is a symmetrical reflection of element e' and likewise becomes parabolic. A similar argument can derive the shape of elements g' and h', by substituting coordinates appropriately and replacing A by 1/A. FIG. 3C is an illustration of such a device.

Referring now to FIG. 3C, the curving of the edge devices now causes an additional problem. It is desirable to define an active area within the apparatus the original area of size 2v x 2u. The total voltage gradient across this area is not the same as the voltage being applied to the corners of the apparatus. Consequently, it is necessary to add additional resistance at each corner so that the voltage in the non-invasive edge elements corresponds to the voltage in the active area. It is also necessary to include the additional resistance in the active edge in the computations. By solving simultaneous current equations, the additional resistance between the voltage source and the edge elements can be determined. R1 is the resistance for elements e'' and f'' and R2 is the resistance for elements g'' and h'', as described in the following equations:

$$R_1 = A\rho(D^2/0.5\text{-}D); \text{ and}$$

$$R_2 = (\rho/A)(D^2/0.5\text{-}D),$$

where $D=(R/4\rho A)$.

Although this approach can be used to create a useful apparatus, it is extremely difficult to manufacture. The actual geometry of the edge devices depends on the ratio of R and $\rho$ and the value of A. The aspect ratio A is always known at design time, bu the actual values of R and $\rho$ vary significantly in manufacturing. In order to manufacture a screen of this type with a fixed geometry, the value of $\rho$ would have to be measured for each unit and an appropriate material would have to be used to create the linear resistive elements with the exact ration of R to $\rho$ that was used to generate the geometry of the apparatus. In practice, it is not currently feasible to create resistive films with this degree of accuracy and predictability.

A discrete approximation of continuous resistive edge elements around an active area on surface 10 provides advantages because the discrete approximation is generally practical and produces an apparatus which is both easy to manufacture and also accurate. Given a resistive element with resistance R, it could be replaced with a serial network of n resistors, each with a resistive value of (R/n). If the value of n is chosen appropriately, this network will approximate the behavior of continuous parabolic resistive elements disposed around the perimeter of surface 10 and defining an active area within the perimeter. In order to provide behavior similar to that of continuous resistive elements, such a resistor network must be connected to surface 10 in a similar manner. It is only possible to connect this network to surface 10 at the points where resistors meet. There are (n−1) such points, plus the two points where each resistor network is connected to corner connectors 26, summing to a total of (n+1) such points. Each of these (n+1) points has an equivalent resistance to the end of the network, R(i). The point with resistance R(i) must make contact with surface 10 at the same point where the parabolic continuous resistive element, if used, would have had a resistance to the endpoint of R(i).

Since it would be difficult to connect these parts to a device in the shape of a parabola, the invention instead uses a linear resistor network to replace the hypothetical continuous resistor, as can be seen in FIG. 2, FIG. 2A, and FIG. 2B. This linear element is then tapped at the aforementioned (n+1) points and connected through a conductive extension to surface 10. The conductive extension generally follows the same path as the hypothetical continuous parabolic element did, i.e., it is pulled back from the active area enough so that the voltage drop creates an equal potential at the edge of the active area when an electric potential is applied across surface 10. Conductors can be produced with a conductive ink, which need not have the same precision as a resistive ink. The actual geometry of the device can be determined at design time, with the values of the resistors determined after measuring the resistivity of the resistive surface. These resistors can be measured prior to assembly rather than being manufactured to a specific value. Since the conductors can be printed in conductive ink, their geometry can be easily controlled to a tight tolerance. Other methods can be used to create the conductors as well, and will be obvious to those skilled in the art.

The shape of the extensions has been determined empirically so that they are spaced far enough apart so as not to interfere with each other, yet they cover adequate area to control the potential in the region surrounding them and can supply adequate current to surface 10. The resistive networks and their contacts to the extensions need not lie on the resistive surface 10—only the ends on the extensions need do so. However, it has been noted that these elements can all lie on the resistive surface without significantly interfering with the ability of the extensions to control the potential at the edge of the active area. Corner connectors 26 serve as attachment points for the corner resistors and the voltage supplies through which an electric potential is supplied to surface 10.

In order to produce such devices without having to measure the resistivity and, since a single resistive surface is generally quite uniform, then invention utilizes an "integral resistor". This resistor was designed so that its resistive value is determined by and directly proportional to the resistivity of the resistive surface it is printed on.

Given a strip of a resistive material with sheet resistivity rho (denoted $\rho$), such as surface 10, between two parallel conductive elements with length L and width W, the resistance between the conductors is equal to (92 W/L). This information allows the use of resistors between the extensions in the pattern of resistors such that, as the value of $\rho$ changes, the value of the resistors changes proportionately. Since the geometry of such a device depends only on the ratio of R to $\rho$, the geometry of the resistors/conductive elements need not change in response to differences in the resistivity of the surface. Also, the invention can be manufactured by laying a single conductive layer in an appropriate desired pattern onto a single resistive layer, such as surface 10.

In practice, we have obtained best results when the ratio of W to L for such resistors is very low. Therefore, since the minimum value of W is determined by the resolution of the production process, L often became very large. If L was too large, the resistor would not fit between the extensions on the pattern formed on surface 10. Therefore, the invention utilizes a more advanced integrated resistor. The resistors in FIG. 2B consist of twisted gaps or spaces 28, 29 between the facing edges of two adjacent conductive elements, such as electrodes 20 and corner electrodes 22, placed on surface 10. FIG. 3D shows a straight space between conductive elements and FIG. 3E shows detail for the twisted gaps or spaces between adjacent conductive elements. Such twists can be defined by projections extending laterally from one electrode toward an adjacent electrode and into a recess of the adjacent electrode, with the edges of the projection and the recess maintained a selected distance apart. As is seen in FIGS. 2 and 3E, the length of the twisted gap is able to be much longer than the length of the base portions of the two adjacent electrodes transverse to the surface edge; therefore the length of the electrodes needed to create such a gap length thereby does not need to protrude extensively into area 15, enabling the active portion of area 15 to be kept large. The current flowing across spaces 28, 29 is subject to resistance from the resistivity of surface 10. A number of these integrated resistors have been produced and can be characterized, so that it is possible to predict the value of a resistor (in terms of $\rho$) by knowing its dimensions. Consequently, it is possible to select the desired resistive values by selectively determining the dimensions of spaces 28, 29.

Spaces 28, 29, once selected for a desired application for values of $R_1$ and $R_2$, are easily created by selectively disposing electrodes 20, corner electrodes 22, and corner connectors 26 on surface 10. Selectively silk-screening electrodes 20, corner electrodes 22, and corner connectors 26 onto surface 10 according to a preselected geometry, creates spaces 28, 29 and provides the desired resistive values as discussed in more detail below. Because electrodes 20, corner electrodes 22, and corner connectors 26 can be silk-screened onto surface 10, their pattern and dimensions can be controlled to tight tolerances.

The pattern and dimensions, i.e., the "geometry" of space 28, 29 on surface 10, as described in more detail below, are selectively chosen so that the resistivity of surface 10 in spaces 28, 29 (i.e., $R_1$ and $R_2$, respectively) provides suitable values of resistance between corner connectors 26, corner electrodes 22, and electrodes 20; i.e., spaces 28, 29 provide suitable "resistivities," which can be preselected for a desired application. By using appropriate patterns and dimensions for spaces 28, 29, the use of resistive elements, such as individual resistors or Nichrome wire, connected to electrodes 20, corner electrodes 22, or corner connectors 26 and either located on surface 10 or located off surface 10, is avoided. The resistivities of surface 10 resulting from spaces 28, 29 avoid the need for such resistive elements connected between electrodes 20, corner electrodes 22, and corner connectors 26, instead using the resistivity of surface 10 to create the desired resistivities.

The appropriate geometry of electrodes 20, corner electrodes 22, and corner connectors 26 are a function of the combination of the resistance of surface 10, the conductivity of electrodes 20 and corner electrodes 22, the number of electrodes 20 on each side 11 of surface 10, along with corner electrodes 22, and the size of area 15. The appropriate pattern and dimensions of electrodes 20, corner electrodes 22, and corner connectors 26 have been heuristically determined. We have achieved best results when the ratio of the width of the bar portions of T-shaped electrodes 20 to the width of the surface distance between each electrode 20 is from about the forty percent (40%) to about sixty percent (60%). It will be obvious to those skilled in the art to vary the widths with corresponding variations in accuracy and operation as a result. Practically, the width of the stems and bars of T-shaped electrodes 20 is only limited by the process chosen to fabricate electrodes 20. Additionally, minimizing the spacing between electrodes 20 creates a lower resistivity; decreasing the value of the resistivity leads to greater power consumption, which may be undesirable. We have found that the present invention minimizes the degree to which the electrodes extend in area 15, thereby maximizing the amount of the active area of surface 10.

As shown in FIG. 2C, we have found that the following example achieves excellent results:

| Measurement | Value | Measurement | Value |
| --- | --- | --- | --- |
| a | 15.0 mm | h | 15.0 |
| b | 14.5 | i | 13.0 |
| c | 12.0 | j | 170.0 |
| d | 8.0 | k | 139.0 |
| e | 18.0 | l | 127.0 |
| f | 17.5 | m | 91.0 |
| g | 16.5 | | |

Indeed, it seems likely that the advantages presented by the invention in ease of manufacture will make changes in size and shape easier than was heretofore possible.

FIG. 4 describes a contact input system 30, which includes surface 10, electrodes 20, corner electrodes 22, and corner connectors 26. In FIG. 4, surface 10 is substantially rectangular in shape; as previously noted, however, surface 10 need not be this shape, but could be a variety of geometric shapes. Moreover, although surface 10 is shown as planar in FIG. 4, surface 10 could easily be contoured; i.e., non-planar. Contact input system 30 also includes a movable object 2, such as a stylus, pencil, or other object, for touching surface 10. Object 2 can be used by an operator to touch surface 10 of contact input system 30 at a chosen location of area 15.

Contact input system 30 also includes electric circuit 39 for selectively applying an electric potential across electrodes 20 and corner electrodes 22 on a first side 11A of area 15 and electrodes 20 and corner electrodes 22 on a second side 11B of area 15, then selectively applying an electric potential across electrodes 20 and corner electrodes 22 on a third side 11C of area 15 and electrodes 20 and corner electrodes 22 on a fourth side 11D of area 15. As shown in FIG. 4, electric circuit 39 is electrically connected to corner connectors 26 on sides 11C and 11B. The electric potential is selectively applied to sides 11A, 11B and sides 11C, 11D in an alternating fashion. Although FIG. 4 and FIG. 5 disclose the use of electric circuit 39 to alternately apply a selected electric potential across surface 10, it will be obvious to those skilled in the art that an electric potential can be selectively applied across surface 10 in other ways. For example, an electric potential could be applied by simultaneously applying a first electric potential between side 11A and side 11B and a second electric potential between side 11C and side 11D, wherein said first electric potential and said second electric potential are alternating current signals with different frequencies.

We have found that an electric potential applied across sides 11A, 11B and sides 11C, 11D at a rate of about 200 times per second obtains best results. It will be obvious to those skilled in the art, however, to utilize various rates depending on various factors, such as the particular application of the contact input system and the dimensions of the surface of the contact input system.

Alternating the application of an electric potential across sides 11A, 11B and sides 11C, 11D is easily achieved with electric circuit 39 shown in FIG. 5. Electric circuit 39 for selectively applying an electric potential across surface 10 and for determining the location of movable object 2 when movable object 2 is touching surface 10 essentially consists of: microcontroller system 50, comparator 53, drivers 55, 56, 57, 58, analog to digital (A/D) converter 60, regulator 65, switches 70, 71, buffer amplifier 75, and switch 80. As shown in detail in FIG. 5 and explained in more detail below, microcontroller system 50 is electrically connected with comparator 53, A/D converter 60, and to switches 70, 71 and to switch 80. Regulator 65 is connected with switches 70, 71 and with driver 58, while drivers 55, 56, 57 are connected with switches 70, 71, respectively. Switch 80 is connected with buffer amplifier 75 which is connected with comparator 53 and A/D converter 60. Of course, substantially the same results may be obtained with other means without departing from the scope and spirit of the present invention.

The contact input system and its circuitry typically operates by setting a "high" electric potential (usually +5V) on a first corner of surface 10 and a "low" voltage level on a second corner which is diagonal to the first. The voltage levels at the other two corners of surface 10 are selectively switched so that in one state the third corner has a high voltage level while the fourth corner has a low level and in a second state the third corner has a low voltage level and the fourth corner has a high level.

A probe 2 selectively contacts surface 10 of the digitizer or contact input system and measures a voltage or current level. This level (voltage or current) is passed through buffer amplifier 75 and into A/D converter 60 and comparator 53. In this circuit, comparator 53 compares the voltage level and, if that level is less than +5V, generates a high logic output signal which indicates the detection of a touch. Upon receiving such a "touch detect" signal, the firmware within microcontroller 50 obtains the first ordinate value from A/D converter 60. Microcontroller 50 then generates switching signals to switches 70,71; when switches 70, 71 are switched, the voltage levels of corners three and four are switched so that an electric current flows perpendicular to the previous direction in the first state. Microcontroller 50 then obtains from A/D converter 60 the second ordinate which corresponds to the location of probe 2 on surface 10.

Microcontroller 50 switches the voltage levels at the corners of surface 10 while a touch detect signal is generated by comparator 53. Microcontroller 50 does not switch the voltage levels until after the conversion by A/D converter 60 is completed. While comparator 53 continues to provide a touch detect signal, microcontroller 50 continues to switch the voltage levels and, if the touch detect signal exists for a long enough period, obtains multiple measurements of the ordinates from A/D converter 60.

Microcontroller 50 also uses firmware which filters the data received. The filtering algorithm smooths the data points. In addition, microcontroller 50 converts the desired output data into a desired format. We have found that different formats may be desirable for different applications. It will be obvious to those skilled in the art to program microcontroller 50 to provide output data in a desired format.

Microcontroller 50 also provides an impedance control signal to switch 80. The touch detect signal from comparator 53 is tested by microcontroller 50. If the impedance in the touch detect signal remains fairly high, microcontroller 50 closes switch 80 to prevent the system from treating the situation as a "touch" or "hit". When the impedance in the touch detect signal is low, indicating a strong touch on surface 10, the change in impedance from the previous state (i.e., the absence of a touch) will be marked, and microcontroller 50 will not close switch 80. Thus, the impedance control signal from microcontroller 50 operates to selectively enable the system. Depending upon the desired sensitivity level, the firmware can be programmed to selectively determine when microcontroller 50 will close switch 80 via an impedance control signal. The other components shown in FIG. 5 are of types which are generally known. Regulator 65 is used to provide a steady signal of +5V, buffer amplifier 75 is used to boost the signal received from probe 2, and drivers 55, 56, 57, and 58 are used to ensure that surface 10 is provided enough current. Switches 70 and 71 can be multiplexers of a type which is well known and commercially available, such as an RCA 4053.

It should also be noted that the functions performed by microcontroller 50 could be performed by electric hardware components. Of course, the use of such hardware components would be obvious to one skilled in the art.

The foregoing disclosure and description of the invention are illustrative and explanatory thereof and it will be understood by those skilled in the art that various changes in size, shape, and materials, as well as in the details of the illustrated constructions may be made within the scope of the following claims without departing from the spirit of the invention.

What is claimed is:

1. An edge linearization device, which comprises:
   a surface having a substantially uniform resistivity and defining a substantially rectangular area with four sides and four corners;
   a plurality of electrodes disposed on said surface on each side of said area and electrically connected to said surface, with at least one of said electrodes having an extension wherein said extension of at least one of said electrodes on each side of said area is inwardly disposed into said area so that at least one extension is more inwardly disposed into said area than said electrodes and said electrodes have a greater conductivity than said surface so that, when an electric potential is selectively applied between said electrodes on a side and said electrodes on an opposing side, a unique electric potential exists corresponding to an object's location on said surface;
   at least one corner electrode disposed on said surface and located on each side of said surface and electrically connected thereto, wherein said corner electrode has a greater conductivity than said surface;

a plurality of corner connectors disposed on said surface and electrically connected thereto and positioned adjacent said corners of said area;

said electrodes, said corner electrodes, and said corner connectors are selectively disposed on said surface and include edges laterally therealong defining gaps therebetween and further include projections extending laterally therefrom and corresponding projection-receiving recesses extending thereinto with said edges thereof maintaining a constant selected distance from each other, said gaps thereby having a width equal to said constant distance and a length greater than the length of said electrodes, said corner electrodes and said corner connectors, to create gaps selectively shaped and dimensioned to define preselected resistivities between said electrodes, said corner electrodes, and said corner connectors, whereby the lengths of said electrodes protrude only minimally into the surface from sides thereof while defining separate resistors of greater length, thereby optimizing the active area of said surface, and no resistive elements are otherwise connected between said electrodes, said corner electrodes, and said corner connectors.

2. The edge linearization device according to claim 1 wherein said extension is T-shaped.

3. An edge linearization device, which comprises:

a surface having a substantially uniform resistivity and defining a substantially rectangular area with four sides and four corners;

a plurality of electrodes having extensions disposed on said surface on each side of said area and electrically connected to said surface, wherein said extensions of said electrodes on each side of said area are progressively inwardly disposed into said area from said corners so that at least one center-most extension is most inwardly disposed of said extensions of said electrodes on each side of said area, said progressively inwardly disposed extensions of said electrodes being disposed in the approximate shape of a parabola having a vertex which is near the location of said center-most extension, and said electrodes have a greater conductivity than said surface so that, when an electric potential is selectively applied between said electrodes on a side and said electrodes on an opposing side, a unique electric potential exists corresponding to an object's location on said surface;

at least one corner electrode disposed on said surface and located on each side of said surface and electrically connected thereto, wherein said corner electrode has a greater conductivity than said surface; and a plurality of corner connectors disposed on said surface and electrically connected thereto and positioned adjacent said corners of said area, said electrodes, said corner electrodes, and said corner connectors are selectively disposed on said surface and include edges laterally therealong defining gaps therebetween and further include projections extending laterally therefrom and corresponding projection-receiving recesses extending thereinto with said edges thereof maintaining a constant selected distance from each other, said gaps thereby having a width equal to said constant distance and a length greater than the length of said electrodes, said corner electrodes and said corner connectors, to create gaps selectively shaped and dimensioned to define preselected resistivities between said electrodes, said corner electrodes, and said corner connectors, whereby the lengths of said electrodes need protrude only minimally into the surface from sides thereof to define separate resistors of greater length, thereby optimizing the active area of said surface, and no resistive elements are otherwise connected between said electrodes, said corner electrodes, and said corner connectors.

4. The edge linearization device according to claim 3 wherein said extensions of said plurality of electrodes are T-shaped.

5. An apparatus for producing a potential field having a prescribed geometry comprising:

a surface having a substantially uniform sheet resistivity;

a plurality of discrete electrodes disposed in contact with the surface in at least one row along at least one side of the surface, each electrode having a greater conductivity than the surface;

said electrodes are selectively disposed on said surface and include edges laterally therealong defining gaps therebetween and further include projections extending laterally therefrom and corresponding projection-receiving recesses extending thereinto with said edges thereof maintaining a constant selected distance from each other, said gaps thereby having a width equal to said constant distance and a length greater than the length of said electrodes, said corner electrodes and said corner connectors, to create gaps selectively shaped and dimensioned to define separate resistors having preselected resistivities between said electrodes proportional to the sheet resistivity of the surface;

a plurality of the electrodes include an extension extending transversely to each row of electrodes, an integrated resistor being formed between each extension; and a voltage supply connectable to a first electrode located at one end of the potential field to establish a potential difference between the first electrode and a second electrode located at an opposite end of the potential field, a plurality of intervening electrodes being positioned between the first and second electrodes, whereby the geometry of the potential field is a function of the resistance of the separate resistors between adjacent electrodes, and whereby the lengths of said electrodes need protrude only minimally into the surface from sides thereof to define separate resistors of greater length, thereby optimizing the active area of said surface, and no resistive elements are otherwise connected between said electrodes.

6. The apparatus of claim 5 wherein each electrode is formed of a screen printable conductive ink.

7. The apparatus of claim 6 wherein the surface is formed of a sputtered indium tin oxide layer.

8. An edge linearization device, which comprises:

a surface having a substantially uniform resistivity and defining a substantially rectangular area with four sides and four corners;

a plurality of electrodes disposed on said surface on each side of said area and electrically connected to said surface, each electrode having a greater conductivity then the surface;

at least one corner electrode disposed on said surface on each side of said surface and electrically connected thereto, wherein said corner electrode has a greater conductivity than said surface;

a plurality of corner connectors disposed on said surface and electrically connected thereto and positioned adjacent said corners of said area;

said electrodes, said corner electrodes, and said corner connectors are selectively disposed on said surface and include edges laterally therealong defining gaps therebetween and further include projections extending laterally therefrom and corresponding projection-receiving recesses extending thereinto with said edges thereof maintaining a constant selected distance from each other, said gaps thereby having a width equal to said constant distance and a length greater than the length of said electrodes, said corner electrodes and said corner connectors, to create gaps selectively shaped and dimensioned to define preselected resistivities between said electrodes, said corner electrodes, and said corner connectors proportional to the sheet resistivity of the surface, such that, when an electric potential is selectively applied between said electrodes and corner electrodes on a first side and a second side and between said electrodes and said corner electrodes on a third side and a fourth side, an electric potential field exists having a geometry which is a function of the resistance of said resistors between said electrodes, said corner electrodes, and said corner connectors, and whereby the lengths of said electrodes need protrude only minimally into the surface from sides thereof to define separate resistors of greater length, thereby optimizing the active area of said surface, and no resistive elements are otherwise needed to be connected between said electrodes, said corner electrodes, and said corner connectors.

9. An apparatus for producing a potential field having a prescribed geometry comprising:

a surface having a substantially uniform sheet resistivity;

a plurality of discrete electrodes disposed in contact with the surface, each electrode having a greater conductivity than the surface, said electrodes are selectively disposed on said surface and include edges laterally therealong defining gaps therebetween and further include projections extending laterally therefrom and corresponding projection-receiving recesses extending thereinto with said edges thereof maintaining a constant selected distance from each other, said gaps thereby having a width equal to said constant distance and a length greater than the length of said electrodes, said corner electrodes and said corner connectors, to create gaps selectively shaped and dimensioned to define separate resistors having preselected resistivities between said electrodes proportional to the sheet resistivity of the surface;

a voltage supply connectable to a first electrode located at one end of the potential field to establish a potential difference between the first electrode and a second electrode located at an opposite end of the potential field, a plurality of intervening electrodes being positioned between the first and second electrodes, wherein electrodes are disposed about the perimeter of the surface and the voltage is alternately applied to electrodes in the corners of the surface, whereby the geometry of the potential field is a function of the resistance of the separate resistors between adjacent electrodes, and whereby the lengths of said electrodes need protrude only minimally into the surface from sides thereof to define separate resistors of greater length, thereby optimizing the active area of said surface.

10. The apparatus of claim 9 wherein a plurality of electrodes between the electrodes in the corners of the surface include inwardly extending portions, the inwardly extending portions being parabolically disposed along each side.

11. An apparatus for producing a linearized potential field comprising:

a surface having a substantially uniform sheet resistivity;

a plurality of discrete electrodes disposed in contact with the surface in a row along at least one side of the surface, each electrode having a greater conductivity than the surface, a plurality of electrodes having a base and a projection extending transversely of the side along which the electrodes are disposed;

said electrodes are selectively disposed on said surface and said bases thereof include edges laterally therealong defining gaps therebetween and further include projections extending laterally therefrom and corresponding projectionreceiving recesses extending thereinto with said edges thereof maintaining a constant selected distance from each other, said gaps thereby having a width equal to said constant distance and a length greater than the length of said electrodes, said corner electrodes and said corner connectors, to create gaps selectively shaped and dimensioned to define separate resistors having preselected resistivities between said electrodes proportional to the sheet resistivity of the surface;

a voltage supply connectable to an electrode located at one end of the row of electrodes to establish a potential difference between opposite ends of each row of electrodes, whereby the geometry of the potential field is a function of the resistance of the separate resistors between adjacent electrodes, and whereby the lengths of said bases of said electrodes need protrude only minimally into the surface from sides thereof to define separate resistors of greater length, thereby optimizing the active area of said surface.

12. A contact input system for determining the location of an object in selective contact with a surface having a substantially uniform resistivity and defining a substantially rectangular area with four sides and four corners, which comprises:

a plurality of electrodes having extensions disposed on said surface on each side of said area and electrically connected to said surface, wherein said extensions of said electrodes along each side of said area are progressively inwardly disposed into said area from said corners so that at least one center-most extension is most inwardly disposed of said extensions of said electrodes along each side of said area, said electrodes having a greater conductivity than said surface so that, when an electric potential is selectively applied between said electrodes on a side and said electrodes on an opposing side, a unique electric potential exists for a corresponding location of an object touching said surface;

a plurality of corner electrodes disposed on said surface and electrically connected thereto, wherein said corner electrodes are positioned near said corners of said area;

a plurality of corner connectors disposed on said surface and electrically connected thereto and positioned adjacent said corners of said area;

means connected to said corner connectors for selectively applying an electric potential thereto so that an electric potential exists between a first side of said area and a second opposing side of said area and for selectively applying an electric potential thereto so that an electric potential exists between a third side of said area and a fourth side opposing said third side, wherein said third side and said fourth side are substantially perpendicular to said first side and said second side;

a movable object for selectively contacting said surface; and means responsive to said movable object for determining the location of said movable object on said surface corresponding to an electric potential between said movable object and said electrodes and said corner electrodes and providing an output thereof, wherein said electrodes, said corner electrodes, and said corner connectors are selectively disposed on said surface and include edges laterally therealong defining gaps therebetween and further include projections extending laterally therefrom and corresponding projection-receiving recesses extending thereinto with said edges thereof maintaining a constant selected distance from each other, said gaps thereby having a width equal to said constant distance and a length greater than the length of said electrodes, said corner electrodes and said corner connectors, to create gaps selectively shaped and dimensioned to define preselected resistivities between said electrodes, said corner electrodes, and said corner connectors, whereby the lengths of said electrodes protrude only minimally into the surface from sides thereof while defining separate resistors of greater length, thereby optimizing the active area of said surface, and no resistive elements are otherwise connected between said electrodes, said corner electrodes, and said corner connectors.

13. The contact input system according to claim 12, wherein said progressively inwardly disposed extensions of said electrodes are disposed in the approximate shape of a parabola having a vertex which is near the location of said center-most extension.

14. The contact input system according to claim 12 wherein said extensions of said electrodes on each side of said area are T-shaped.

15. The edge linearization device according to any one of claims 2-4, wherein said surface comprises a glass substrate with a thin film coating and said electrodes comprise a metal ink with a resistivity of less than about 1 ohm per square.

16. An apparatus for producing a potential field having a prescribed geometry comprising:

a surface having substantially uniform sheet resistivity;

a plurality of discrete electrodes disposed in contact with the surface, each electrode having a greater conductivity than the surface;

a plurality of separate resistors, wherein adjacent electrodes are spaced apart by a gap having prescribed dimensions such that the portion of the surface in the gap between adjacent electrodes defines a separate resistor between adjacent electrodes having a resistance proportional to the sheet resistivity of the surface, at least a portion of the gap forming each resistor extending parallel to an axis joining the adjacent electrodes and another portion of each gap extending transverse to said axis; and a voltage supply connectable to a first electrode located at one end of the potential field to establish a potential difference between the first electrode and a second electrode located at an opposite end of the potential field, a plurality of intervening electrodes being positioned between the first and second electrodes, whereby the geometry of the potential field is a function of the resistance of the separate resistors between adjacent electrodes.

17. An edge linearization device, which comprises:

a surface having substantially uniform resistivity and defining a substantially rectangular area with four sides and four corners, said surface comprising a glass substrate with a thin film coating;

a plurality of electrodes disposed on said surface on each side of said area and electrically connected to said surface, said electrodes comprising a metal ink with a resistivity of less than about 1 ohm per square, with at least one of said electrodes having an extension wherein said extension of at least one of said electrodes on each side of said area is inwardly disposed into said area so that at least one extension is more inwardly disposed into said area than said electrodes and said electrodes have a greater conductivity than said surface so that, when an electric potential is selectively applied between said electrodes on a side and said electrodes on an opposing side, a unique electric potential exists corresponding to an object's location on said surface;

at least one corner electrode disposed on said surface and located on each side of said surface and electrically connected thereto, wherein said corner electrode has a greater conductivity than said surface; and a plurality of corner connectors disposed on said surface and electrically connected thereto and positioned adjacent said corners of said area; and said electrodes, said corner electrodes, and said corner connectors are selectively disposed on said surface and include edges laterally therealong defining gaps therebetween and further include projections extending laterally therefrom and corresponding projection-receiving recesses extending thereinto with said edges thereof maintaining a constant selected distance from each other, said gaps thereby having a width equal to said constant distance and a length greater than the length of said electrodes, said corner electrodes and said corner connectors, to create gaps selectively shaped and dimensioned to define preselected resistivities between said electrodes, said corner electrodes, and said corner connectors, whereby the lengths of said electrodes need protrude only minimally into the surface from sides thereof to define separate resistors of greater length, thereby optimizing the active area of said surface, and no resistive elements are otherwise connected between said electrodes, said corner electrodes, and said corner connectors.

* * * * *